(12) United States Patent
Schwandt et al.

(10) Patent No.: US 6,340,328 B1
(45) Date of Patent: Jan. 22, 2002

(54) AIR CURRENT REGULATING NOZZLE ARRANGEMENT FOR VENTILATING THE INTERIOR OF AN AUTOMOBILE

(75) Inventors: Andreas Schwandt, Burgdorf; Silke Hasenauer, Wasbüttel; Bertram Seydell, Braunschweig, all of (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/467,263

(22) Filed: Dec. 20, 1999

Related U.S. Application Data

(63) Continuation of application No. PCT/EP98/00364, filed on Jun. 17, 1998.

(30) Foreign Application Priority Data

Jun. 18, 1997 (DE) .......................................... 197 25 682

(51) Int. Cl.[7] .................................................. B60H 1/34
(52) U.S. Cl. ........................ 454/155; 454/315; 454/320
(58) Field of Search ................................. 454/155, 315, 454/320

(56) References Cited

U.S. PATENT DOCUMENTS

| | | | |
|---|---|---|---|
| 3,949,656 A | 4/1976 | Löhman | |
| 5,063,833 A | 11/1991 | Hara et al. | 454/155 X |
| 5,364,303 A | 11/1994 | Terry | 454/155 |
| 5,470,276 A | 11/1995 | Burnell et al. | 454/155 |
| 5,591,079 A | 1/1997 | Saida | 454/155 |
| 5,660,588 A | * 8/1997 | Kotoh et al. | 454/320 X |

FOREIGN PATENT DOCUMENTS

| | | | |
|---|---|---|---|
| FR | 2710879 | 4/1995 | |
| JP | 63-113248 | * 5/1988 | 454/315 |
| JP | 3-67950 | * 3/1991 | 454/315 |

* cited by examiner

*Primary Examiner*—Harold Joyce
(74) *Attorney, Agent, or Firm*—Baker Botts LLP

(57) ABSTRACT

An air current regulating nozzle arrangement for ventilating the interior of an automobile includes an air duct with a base wall, a top wall, and two opposed side walls leading to an air discharge opening to the interior of the automobile and an array of slats mounted in the air duct adjacent to the air discharge opening which includes a fixed slat and several slats spaced one above the other which are pivotable around horizontal axes. The pivotable slats are connected to an adjusting element inside the air duct so that they can be shifted between a position in which they are parallel to each other and to the longitudinal axis of the air duct and a position in which they are at divergent angles to each other. To provide an air current regulating nozzle which prevents turbulence to a large extent, the base wall is inclined downwardly in the direction toward the air discharge opening in the region of the array of slats, forming an acute angle with the longitudinal axis. The slat adjacent to the base wall extends parallel to the base wall when in the slots are in the divergent angled position.

23 Claims, 4 Drawing Sheets

AIR CURRENT REGULATING NOZZLE ARRANGEMENT FOR VENTILATING THE INTERIOR OF AN AUTOMOBILE

This is a continuation of copending International application No. PCT/EP98/0364 filed Jun. 17, 1998.

BACKGROUND OF THE INVENTION

This invention relates to air current regulating nozzle arrangements for ventilating the interior of a motor vehicle, in particular nozzle arrangements mounted in the dashboard region of a motor vehicle.

Air current regulating nozzles serve to control the direction and intensity of dispersion of the current produced by the ambient air flow or by a fan and directed into the interior of a motor vehicle. Such nozzles are mounted at air outlets within the motor vehicle.

In order to be able to vary the flow characteristics and direction of discharge of an air current within predetermined limits, such regulating nozzles may be made of arrays of substantially parallel slats, arranged one behind another or one inside another, and operable separately from each other, the slats of one array being capable of pivoting about a vertical axis and those of the other array being capable of pivoting about a horizontal axis.

French published application No. 2,710,879 discloses an air current regulating nozzle arrangement for the dashboard region of a motor vehicle in which two arrays of slats are mounted in an air duct of rectangular cross section one behind another in the longitudinal direction of the vehicle, with one array of slats at the outlet end of the duct made of horizontally extending vertically spaced slats and another array, located upstream of that array, made of vertically extending horizontally spaced slats. The slats of the array adjacent to the interior of the vehicle are supported at the end of the duct opening into the interior of the vehicle and are capable of pivoting individually and, on the upstream side away from the pivotal support, the slats are articulated to a connecting member that cooperates with a central control element engaging the connecting member approximately at its center. The slats located above the control element on the connecting member are movable by longitudinal motion of the control element and some of the slats below them are provided with connecting link guides. When the control element is moved in the longitudinal direction of the vehicle, the slats are pivotable between a position in which they are disposed in parallel planes and a position in which they are diverging in the direction toward the interior of the vehicle. In the divergent position of the slats the air current undergoes a slight spread with associated flow losses, but has practically no deflection in the downward direction. In this discharge nozzle arrangement the cross sectional areas between the array of slats and the nozzle housing are reduced. Therefore, in some cases unpleasant turbulence may be experienced by the passengers in the vehicle.

The slats which are oriented vertically and spaced horizontally are also linked with the control element and are arranged so that, when the control element is reversed, they are capable of pivoting about their vertical axes and are capable of being brought into a position of divergence in the longitudinal direction of the vehicle. In this position the slats conduct the air current in a more funnel-shaped fashion to the array of slats adjacent to the interior of the vehicle and hence they alter the characteristics of the air flow in the same way as the array of slats adjacent to the interior. Added to this, however, the control element is displaceable transversely with respect to the longitudinal direction of the vehicle so that the vertically oriented slats are capable of being pivoted with respect to the longitudinal direction of the vehicle and hence the direction of the air current flowing through the array of slats toward the interior of the vehicle is variable in the horizontal plane. Thus, by the cooperation of the two arrays of slats, air currents can be adjusted in very different directions and characteristics.

Although, for the reasons mentioned above, this relatively complicated air current regulating nozzle permits a slight dispersion of the air current and a change in direction of the air current, it does not produce a desired broad spread but, rather, causes a reduction of air mass flow with practically no fanning out of the air current, since the discharge cross section does not vary.

SUMMARY OF THE INVENTION

Accordingly, it is an object of the present invention to provide an air current regulating nozzle arrangement for motor vehicles which overcomes disadvantages of the prior art.

Another object of the invention is to provide an air current regulating nozzle arrangement for ventilating the interior of a motor vehicle by which the production of undesirable turbulence can largely be eliminated.

These and other objects of the invention are attained by providing an air current regulating nozzle arrangement in which, optionally, a parallel air flow can be set for confining the air current or a divergent air flow can be set for spreading of the air current. To this end, in contrast to prior art arrangements, the nozzle housing structure is modified to permit divergent flow without restriction of the air flow cross-section and the slat displaceability is adapted to this modification. A simply designed array of slats mounted adjacent to the air duct outlet can be provided in an advantageous manner with this arrangement.

In a preferred embodiment, an air duct of substantially rectangular cross section has a base wall, a top wall and two side walls, terminating in an outlet opening to the interior of the vehicle and an array of slats is arranged in the opening in vertically spaced relation, each slat being capable of pivoting motion about a horizontal axis. These slats are adjustable by an adjusting member between a position in which they are in parallel planes to each other and to the longitudinal axis of the air duct and a position in which they diverge from each other toward the duct outlet opening, so that the characteristic of the air current conducted into the interior of the motor vehicle and its direction in the vertical plane are variable.

According to the invention, the base wall of the air duct in the region of the array of slats adjacent to the opening is preferably inclined downwardly at an acute angle to the duct axis and the lower slat of the array is oriented parallel to the inclined region of the base wall when the slats are set in the position of divergence. This arrangement, regardless of the specific position of the slats, avoids undesirable side currents of air in directing ventilation toward the interior of the vehicle. Angles of inclination of the inclined wall portion of 15°–25°, through which the cross-sectional areas of the air current regulating nozzle is only negligibly enlarged, have been found to be sufficient. In one embodiment of such a nozzle housing arrangement for use by the assignee of the applicant in the vehicle series T4 and Sharan, preferably in the region of the air-conditioning inside-roof lining, the optimum inclination of the inclined wall portion is between 19° and 21°. However, use of such the air current regulating nozzle arrangements according to the invention in the region of the dashboard or vehicle side wall coverings is also possible.

A conventional array of slats capable of pivoting on vertical axes may be mounted upstream of the array located adjacent to the end of the air duct to direct the air current in a more or less funnel-shaped pattern or, alternatively, in a direction inclined to the longitudinal axis of the air duct toward the array of slats at the end of the duct and thereby contribute to still more differentiated ventilation of the interior of the vehicle.

The downwardly inclined wall region of the duct may be arched slightly downwardly in order to reliably prevent turbulence of the air stream at the lower horizontal edge of the duct opening, even at a higher ventilating rate with higher air current velocity. In this arrangement the base wall region, at its outlet opening edge, is directed at a small acute angle with respect to the lower slat rather than being parallel with respect to that slat.

According to the invention, the array of slats adjacent to the outlet opening is arranged so that the upper slat is mounted in fixed position and the other slats of the array are pivotally mounted on the side walls by pivot pins. The adjusting member is pivotally connected to the upper slat for motion about a pivot axis located at a distance inwardly from the outlet opening and adjacent to one end of the upper slat on the inside of the air duct. The adjusting member is also linked to the other slats and to a horizontally located control wheel so that, upon a rotation of the control wheel, the adjusting member is swung about its pivot axis at the upper slat, causing each of the lower slats to be swung through a different angle about its horizontal axis of rotation, with the pivot angle of each slat being greater than that of the slat above it.

In this arrangement the adjusting member may be a simple pendulum bar which has an entraining pin spaced from the pivot axis and captured in a slotted recess provided on the control wheel at a distance from the axis of rotation of the control wheel and also has carrier pins for engagement in guides provided at the ends of the lower slats. These guides may either be incorporated in the ends of the slats or provided on guide elements that are firmly connected with the slats. The pendulum bar and the control wheel are mounted in a simple manner between the ends of the of slats and a side wall and the control wheel may be provided with an aperture to accommodate the pivot pins of the slats which are mounted in the adjacent side wall.

The slat array and control arrangements described above are also applicable to the vertical slats to control the spreading of the air current in a horizontal plane.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
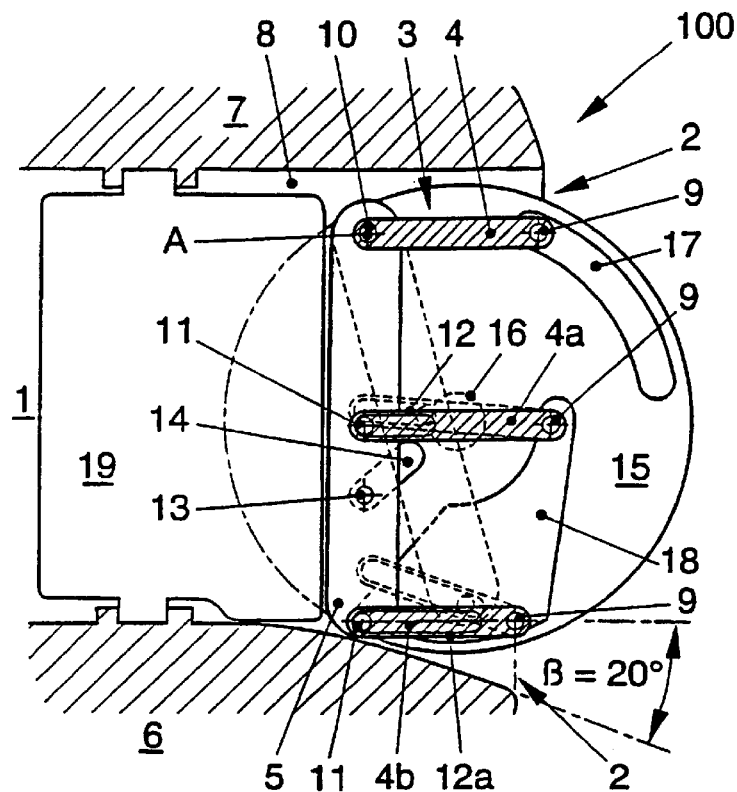
FIG. 1 is a view in longitudinal section taken along the line I—I of FIG. 3 illustrating a representative embodiment of an air current regulating nozzle arrangement according to the invention with an array of slats located in parallel positions.
Figure 2:
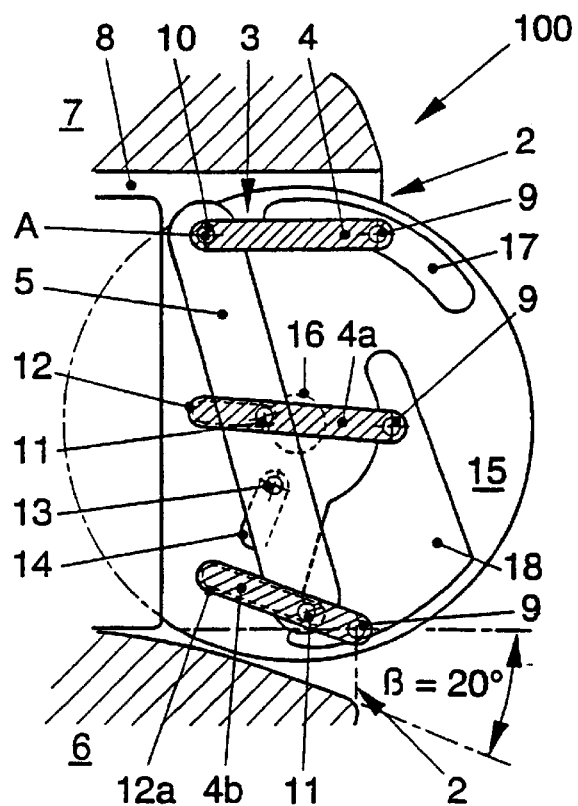
FIG. 2 is a similar view showing the array of slats in a position of divergence.

In the typical embodiment of the invention shown in the drawings, an air current regulating nozzle arrangement 100 includes an air duct 1 having an outlet opening 2 facing the interior of a motor vehicle and an array of slats 3 mounted adjacent to the opening 2. The array of slats in the illustrated embodiment consists of three horizontal slats 4, 4a and 4b, which are vertically spaced from each other and connected by a pendulum bar 5. By moving the pendulum bar 5, the slats 4a and 4b are adjustable about horizontal axes between positions parallel to each other and to the longitudinal axis of the air duct 1, as shown in FIG. 1, and positions of divergence from each other as shown in FIG. 2. The array of slats 3 is encompassed by a base wall 6, a top wall 7, and two opposite side walls 8, which together constitute a nozzle housing not separately labeled. The base wall 6 has a surface portion which is inclined downwardly with respect to the longitudinal axis with a slight arching. In this case, the inclined portion of the base wall 6 forms an angle $\beta=20°$ with the longitudinal axis, and the lower slat 4b, when in the position of divergence shown in FIG. 2, extends parallel to the inclined portion base wall, and thus likewise forms an angle of 20° with respect to the longitudinal axis of the air duct 1.

Figure 3:
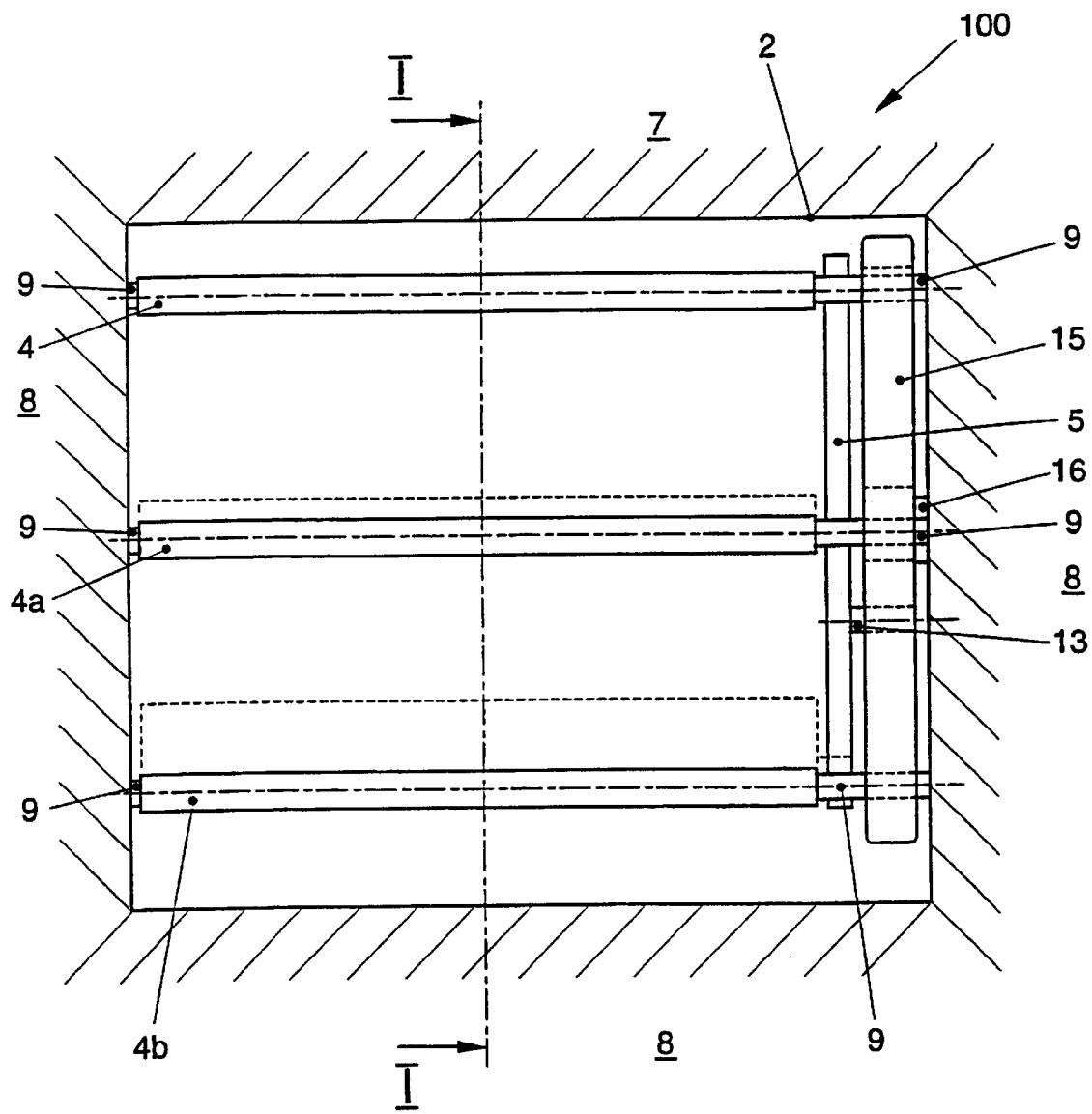
FIG. 3 is a front view of the air current regulating nozzle arrangement of FIGS. 1 and 2.

The slats 4, 4a and 4b are mounted in the side walls 8 by pins 9 as shown in FIG. 3. The upper slat 4 is firmly fixed in position by additional pins 10 in the side walls 8, while the other slats 4a and 4b are capable of pivoting about the corresponding pins 9. The pendulum bar 5 is pivotable around an axis A at one of the pins 10 and carries two pins 11 at different distances from the pivot axis A, which are in engagement with guides 12 and 12a formed in the ends of the slats 4a and 4b, respectively, at the pendulum-bar end of the slats. In addition, the pendulum bar 5 has an entraining pin 13 on the side away from the pin 11 which is received in a slotted recess 14 of a control wheel 15 located between the pendulum bar 5 and the adjacent side wall 8, the entraining pin 13 being located at a distance from the axis of rotation of the wheel in the radial direction. The control wheel 15 is supported for rotation by a linking pin 16 in the side wall 8 and it has two apertures 17 and 18 to permit unhindered rotation with respect to the pins 9 which extend from the slats to the side wall 8.

An additional array of slats 19, containing a plurality of horizontally spaced slats, which are pivotable about vertical axes, is mounted in the inside of the air duct 1 upstream of the array of slats 3 in a conventional manner and therefore is not shown in detail.

The control wheel 15 is rotated to regulate the air current. Counterclockwise rotation as seen in FIG. 1 and FIG. 2 causes the pendulum bar 5 to pivot about the pivot axis A as a result of the motion of the entrained pin 13 so that the pins 11 move in circular paths in the slotted guides 12 and 12a. This causes the slats 4a and 4b to pivot about their horizontal axes passing through the corresponding pivot pins 9, the slat 4b pivoting through a larger angle than the slat 4a, so that the condition of divergence illustrated in FIG. 2 in the direction of the opening 2 is reached in which the slat 4b extends parallel to the inclined region of the base wall 6. In the possible intermediate positions between the position shown in FIG. 2 and the parallel position shown in FIG. 1, the slats 4, 4a and 4b are likewise oriented in a diverging arrangement and, additionally, the slat 4b diverges with respect to the base wall 6. Turbulence of the air current in every possible position of the slats is thereby avoided.

Figure 4:
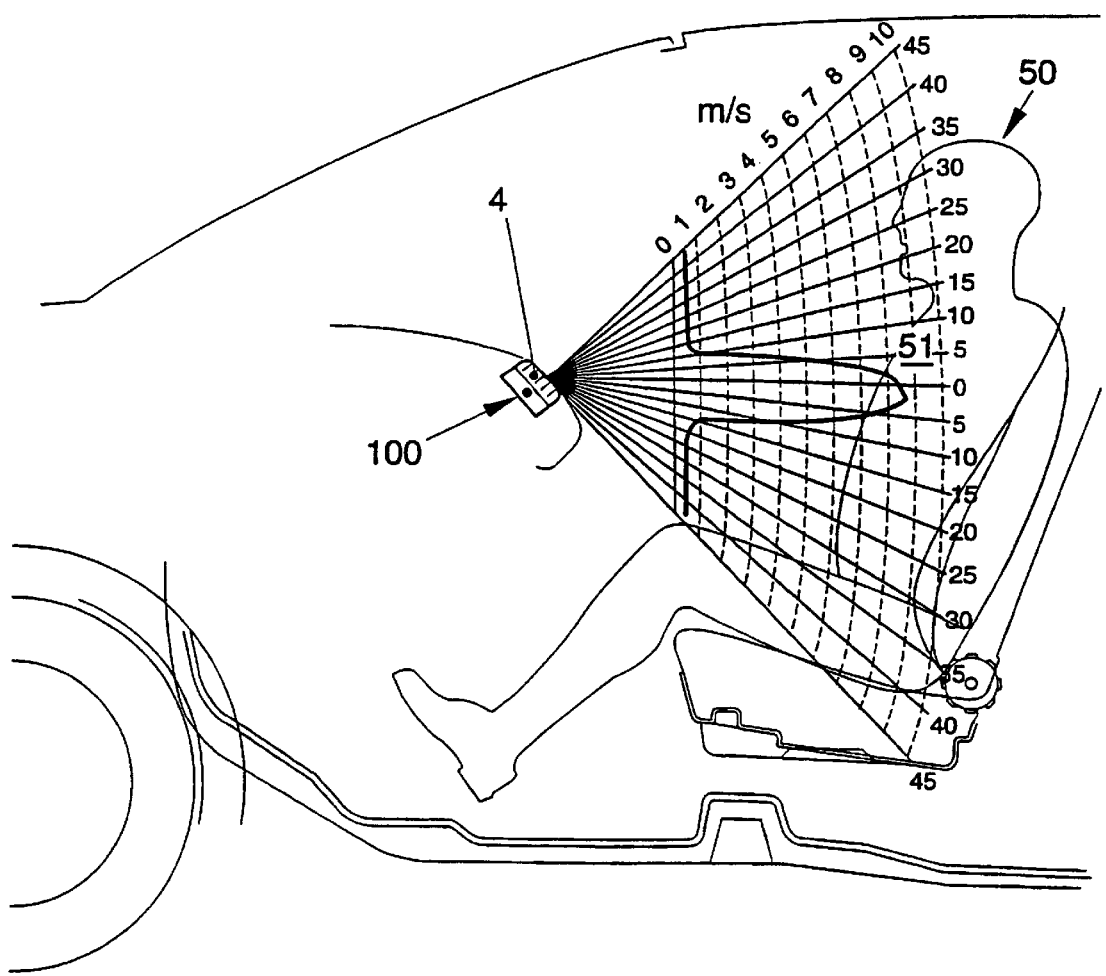
FIG. 4 is a diagrammatic view showing an air current distribution profile with the array of slats in a first nozzle setting.
Figure 5:
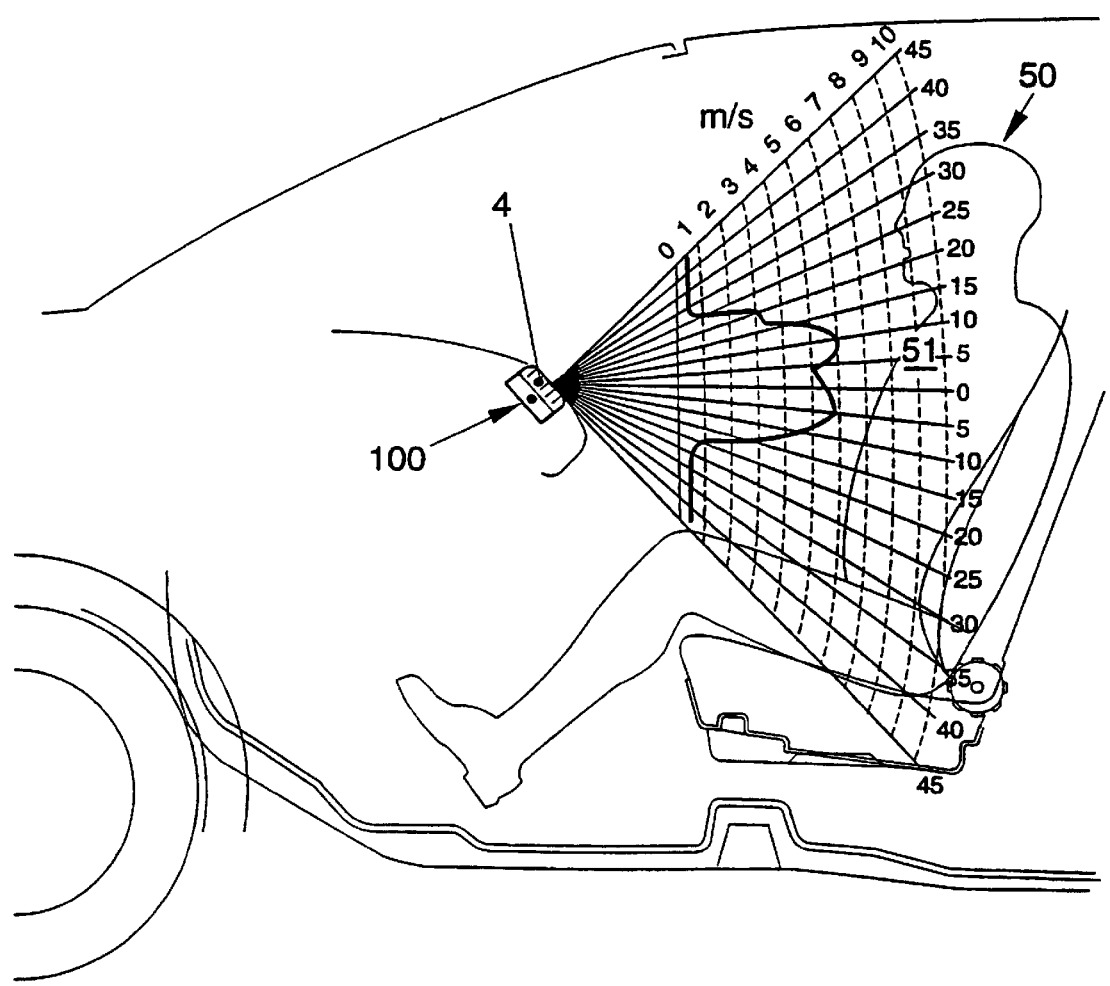
FIG. 5 is a diagrammatic view showing an air current distribution profile with the array of slats in a second nozzle setting.

The operation of the air discharge nozzle according to the invention is illustrated in FIGS. 4 and 5. In this illustration, the air current regulating nozzle 100 is located in a dashboard and is aligned toward a chest region 41 of a driver or person sitting next to the driver 50. For the distribution pattern shown in FIG. 4, the slats of the air current regulating nozzle 100 are in the position shown in FIG. 1 so that the angle of air discharge is relatively small. In the illustrated case the angle of air discharge in which the air current velocity is at least about one-half the maximum air current velocity is about 15° as shown in the graph 51. In this way an intensive air flow, striking only a narrow region of the body, is obtained, which is experienced by the person 50 as intensive cooling. When sufficient cooling has been obtained, the person 50 desires a broader dispersion of air, which according to the invention is obtained by moving the air current regulating nozzle 100 into the position shown in FIG. 2. This adjustment may alternatively be effected in intermediate steps. Such adjustment causes the air current profile to be distinctly broadened and the angle in which the air current velocity is at least about half the maximum is now about 35°, with a somewhat lower maximum air current velocity as shown in the graph 51 of FIG. 5. At the same time, because of the increased cross section of the opening, the flow resistance of the regulating nozzle 100 is also reduced, so that the air throughout is increased by at least 20% at the maximum slat divergence in comparison with the minimum slat divergence. This gives the person 50 a pleasant cooling sensation, since large regions of the body are covered by the air current.

With the air discharge nozzle arrangement according to the invention, a driver, upon entering a motor vehicle which has been heated up in particular by solar rays, can direct a strong concentrated flow of cooling air to the chest. A little later the driver can direct an increased cool air mass flow to broader regions of the body, while the main direction of flow of the nozzle remains substantially unchanged. The variation in flow takes place substantially without causing turbulent flow, so the disadvantages of turbulence, such as the development of noise and a weak air current, are avoided.

Although the invention has been described herein with reference to specific embodiments, many modifications and variations therein will readily occur to those skilled in the art. Accordingly, all such variations and modifications are included within the intended scope of the invention.

We claim:

1. An air current regulating nozzle arrangement for ventilating the interior of a motor vehicle comprising a nozzle having an air flow passage with an air discharge opening and adjusting means for adjusting an air flow passing through the nozzle, wherein the nozzle passage has at least one outlet section which widens in the direction toward the air discharge opening wherein the adjusting means include an array of slats including at least two slats which are supported adjacent to their outer edges by first supports located at fixed positions with respect to the air flow passage and are supported at locations spaced inwardly from the outer edges by second supports which are movable to cause the slats to rotate with respect to each other between parallel orientations in which one of the slats engages a wall of the outer section to reduce the cross section of the air flow passage at the discharge opening and provide an intensive parallel air flow and orientations in which the slats diverge outwardly toward the air discharge opening to provide a diffused air flow.

2. An air current regulating nozzle arrangement according to claim 1 wherein the slat engaging a wall of the outlet section has a first edge extending transverse to the air flow direction in the passage which is movable toward and away from an adjacent wall of the nozzle passage section which widens in the direction toward the air discharge opening, and having a second edge.

3. An air current regulating nozzle arrangement for ventilating the interior of a motor vehicle comprising a nozzle having an air flow passage with an outlet section which widens in the direction toward an air discharge opening, an array of spaced slats disposed in the air flow passage, and at least one adjusting means for pivoting at least some of the slats so that at least one of the slats diverges with respect to at least one adjacent slat with respect to the direction of air flow in the passage, and so that the size of the air flow passage and/or of the spacing of edges of the slats facing the air discharge opening is variable together with the divergence of the slats, wherein at least two slats in the array are supported adjacent to their outer edges by first supports located at fixed positions with respect to the air flow passage and are supported at locations spaced inwardly from their outer edges by second supports which are movable to cause the slats to pivot between parallel orientations in which one of the slats engages a wall of the outlet section to reduce the cross section of the air flow passage at the air discharge opening and provide an intensive parallel air flow and orientations in which they diverge outwardly with respect to air discharge opening to provide a diffused air flow.

4. An air current regulating nozzle arrangement for ventilating the interior of a motor vehicle comprising a nozzle having an air flow passage with an air discharge opening directed toward the interior of the vehicle, wherein the nozzle has an outlet section which widens in the direction toward the air discharge opening an array of spaced pivotable slats within the air flow passage adjacent to the air discharge opening, at least one adjusting means for adjusting a plurality of slats in the array so that at least one of the slats diverges with respect to at least one adjacent slat with regard to the direction of air flow in the passage, and an arrangement for reducing the flow resistance of the nozzle and/or for increasing the rate of air flow through of the nozzle with increasing divergence of the slats, wherein at least two slats in the array are supported adjacent to their outer edges by first supports located at fixed positions with respect to the air flow passage and are supported at locations spaced inwardly from their outer edges by second supports which are movable to cause the slats to pivot between parallel orientations in which one of the slats engages a wall of the outlet section to reduce the cross section of the air flow passage at the air discharge opening and provide an intensive parallel air flow and orientations in which they diverge outwardly with respect to air discharge opening to provide a diffused airflow.

5. An air current regulating nozzle arrangement according to claim 3 or claim 4 wherein the slat divergence takes place while essentially maintaining the main direction of flow air from the air discharge opening.

6. An air current regulating nozzle arrangement according to claim 3 or claim 4 wherein, at a maximum slat divergence, the rate of flow of air through the air flow passage air is increased by at least 20% with respect to that at a minimum slat divergence setting.

7. An air current regulating nozzle arrangement for ventilating the interior of a motor vehicle comprising a nozzle having an air flow passage with an outlet section which widens in the direction toward an air discharge opening facing the interior of the vehicle and an array of adjustably coupled slats adjacent to the air discharge opening which are capable of being pivoted so that at least one of the slats diverges with respect to at least one adjacent slat, at least one of the slats being movable so that a first edge of the slat extending transverse to the direction of air flow is closer to an adjacent surface of the nozzle air flow passage than a second edge of the slat extending transverse to the direction of air flow, wherein at least two slats in the array are supported adjacent to their outer edges by first supports located at fixed positions with respect to the air flow passage and are supported at locations spaced inwardly from their outer edges by second supports which are movable to cause the slats to pivot between parallel orientations in which one of the slats engages a wall of the outlet section to reduce the cross section of the air flow passage at the air discharge opening and provide an intensive parallel air flow and orientations in which they diverge outwardly with respect to air discharge opening to provide a diffused air flow.

8. An air current regulating nozzle arrangement according to claim 2 or claim 7 wherein the first slat edge is movable to a location which is between one-half the distance of the second slat edge from the adjacent nozzle passage surface and a position against the adjacent nozzle passage surface.

9. An air current regulating nozzle arrangement according to claim 8 wherein the first slat edge is farther from the interior of the motor vehicle than the second slat edge.

10. An air current regulating nozzle arrangement according to any one of claims 3, 4 and 7 wherein a slat of the array is adjacent to a surface of the section which widens toward the air discharge opening and is movable with respect to that surface so that the rate of air flow through the air discharge opening is variable.

11. An air current regulating nozzle arrangement for ventilating the interior of a motor vehicle comprising a nozzle having an air flow passage with an air discharge opening, an array of spaced slats mounted in the air flow passage adjacent to the air discharge opening, and at least one adjusting means for pivotally adjusting a plurality of slats in the array between a first arrangement and a second arrangement in such a way that at least one of the slats diverges with respect to at least one other slat, the cross section of the air discharge opening and/or the spacing of at least one of the slats from an adjacent surface of the air flow passage being variable together with the divergence of the slats wherein:

the nozzle passage includes an outlet section which widens in the direction toward the air discharge opening; and at least one of the slats is movable into a first position in which part of the air flow in the passage flows between the at least one slat and an adjacent surface of the air flow passage in the section which widens in the direction toward the air discharge opening to diffuse the air flow and is movable into a second position against the adjacent surface of the air flow passage to cut off the air flow therebetween and cause the air to flow toward the air discharge opening along a surface of that slat which faces away from the adjacent surface of the air flow passage, wherein at least two slats in the array are supported adjacent to their outer edges by first supports located at fixed positions with respect to the air flow passage and are supported at locations spaced inwardly from their outer edges by second supports which are movable to cause the slats to pivot between parallel orientations in which one of the slats engages a wall of the outlet section to reduce the cross section of the air flow passage at the air discharge opening and provide an intensive parallel air flow and orientations in which they diverge outwardly with respect to air discharge opening to provide a diffuse air flow.

12. An air current regulating nozzle arrangement according to claim 11 wherein an upper slat in the array of slats is mounted in fixed position and the other slats in the array are mounted by pivot pins in opposite side walls of the nozzle passage, and wherein the adjusting means is pivotally linked to the upper slat and is coupled to the other slats of the array and includes a control wheel and an adjusting member movable by rotation of the control wheel to pivot about a pivot axis to cause the other slats of the array to be pivoted about corresponding horizontal axes, with the angle of pivot of each of the other slats being greater than that of an adjacent upper slat of the array.

13. An air current regulating nozzle arrangement according to claim 12 wherein the adjusting member is a pendulum bar pivotally linked to the upper slat at a pivot axis and having an entraining pin spaced from the pivot axis which engages a slotted recess in the control wheel at a location spaced from the axis of rotation of the control wheel, the pendulum bar being provided with pins which engage corresponding guides on the other slats of the array, and wherein the control wheel has openings through which the pivot pins of the slats extend between the slats and an adjacent side wall.

14. An air current regulating nozzle arrangement according to claim 13 wherein the guides are formed by guide elements associated with the slats.

15. An air current regulating nozzle arrangement comprising an air duct having a base wall, a top wall and the opposite side walls leading to an air discharge opening and an array of spaced slats mounted in the air duct adjacent to the air discharge opening, wherein the base wall of the air duct in the region of the array of slats has a portion which is inclined at an acute angle away from a longitudinal axis of the air duct to provide a funnel-shaped widening of the air duct in the direction toward the air discharge opening, wherein at least two slats in the array are supported adjacent to their outer edges by first supports located at fixed positions with respect to the air flow passage and are supported at locations spaced inwardly from their outer edges by second supports which are movable to cause the slats to pivot between parallel orientations in which one of the slats engages the inclined base wall to reduce the cross section of the air flow passage at the air discharge opening and provide an intensive parallel air flow and orientations in which they diverge outwardly with respect to air discharge opening to provide a diffuse air flow.

16. An air current regulating nozzle arrangement according to claim 15 wherein a slat adjacent to the base wall is movable to a position substantially parallel to the inclined portion of the base wall.

17. An air current regulating nozzle arrangement according to claim 15 wherein adjacent slats of the array are adjustable to positions in which they diverge by an angle up to 10°.

18. An air current regulating nozzle arrangement according to claim 17 characterized in that the maximum divergence among the slats of the array is in the range from 10° to 35°.

19. An air current regulating nozzle arrangement according to claim 18 wherein the maximum divergence among the slats in the array is in the range from 19° to 26°.

20. An air current regulating nozzle arrangement according to claim 15 wherein the acute angle is in the range from 15° to 25°.

21. An air current regulating nozzle arrangement according to claim 20 wherein the acute angle is in the range from 19° to 21°.

22. An air current regulating nozzle arrangement according to claim 15 including a further array of slats which are pivotable about a vertical axis located upstream of the array of slats adjacent to the air discharge opening.

23. An air current regulating nozzle arrangement according to claim 15 wherein the base wall is arched slightly downwardly in the inclined portion.

* * * * *